United States Patent [19]

Berings

[11] Patent Number: 4,567,414
[45] Date of Patent: Jan. 28, 1986

[54] METHOD AND A DEVICE FOR CONTROLLING A BRUSH-COMMUTATOR ASSEMBLY OF AN ELECTRIC MACHINE

[76] Inventor: Josephus B. M. Berings, Padlaan 11, 1561 Za Krommenie, Netherlands

[21] Appl. No.: 512,894

[22] Filed: Jul. 11, 1983

[30] Foreign Application Priority Data

Jul. 12, 1982 [NL] Netherlands .................. 8202816

[51] Int. Cl.$^4$ .................................. H01R 39/42
[52] U.S. Cl. ........................... 318/542; 318/361; 310/240; 310/243
[58] Field of Search ............. 318/360, 361, 541, 542; 310/240, 239, 241, 243

[56] References Cited

U.S. PATENT DOCUMENTS

| | | | |
|---|---|---|---|
| 884,049 | 4/1908 | Speirs | 310/243 |
| 1,736,844 | 11/1929 | Buchenberg | 310/239 X |
| 2,859,397 | 11/1958 | Bolander | 318/361 X |
| 3,517,239 | 6/1970 | Sedlock et al. | 310/243 X |
| 3,867,679 | 2/1975 | Smith | 318/542 |
| 3,903,442 | 9/1975 | Krulls | 310/241 X |
| 3,982,146 | 9/1976 | Hokky | 310/241 X |
| 4,308,480 | 12/1981 | Moody | 310/242 |

FOREIGN PATENT DOCUMENTS

| | | | |
|---|---|---|---|
| 0734487 | 8/1955 | United Kingdom | |
| 0818292 | 8/1959 | United Kingdom | |
| 0970001 | 9/1964 | United Kingdom | 318/361 |
| 1396309 | 6/1975 | United Kingdom | |
| 2058479 | 4/1981 | United Kingdom | 310/243 |
| 0892547 | 12/1981 | U.S.S.R. | 310/243 |

OTHER PUBLICATIONS

D. L. Lewis and A. J. Walkden, "Mechanical Aspects of Commutation in Traction Motors", GEC Journal of Science & Technology, vol. 40, No. 3, 1973, pp. 99–106.
IBM Technical Disclosure Bulletin, vol. 19, No. 2, p. 429, Jul. 1976.

Primary Examiner—William M. Shoop, Jr.
Assistant Examiner—Bentsu Ro
Attorney, Agent, or Firm—Hopgood, Calimafde, Kalil, Blaustein & Judlowe

[57] ABSTRACT

A method and a device for controlling a brush-commutator assembly of a machine under application of an electrical processing and control unit, by sensing one or more operating parameters of the electric machine, the sensing values being processed and converted into one or more control signals controlling the operation of the brush-commutator assembly to provide an optimal commutation process of the machine current. The machine current is sensed and the pressing exerted on the brushes is controlled by a fluid under pressure; the brush tracks, moreover, being engaged and disengaged upon increase and decrease of the machine current respectively in order to maintain an optimal current density in the brushes. One or more sensors for sensing operating parameters of the electric machine are used and a processing and control unit to process the signals sensed by the sensors and to supply control signals to one or more control means controlling the operation of the brush-commutator assembly. The control device comprises a fluid control circuit having an electrically controllable pressure system. The sensors are operable to detect the temperature of the cooling air and/or of the commutator, the humidity of the cooling air, the commutation noise on the machine current, the speed of revolutions, and extreme mechanical vibrations.

17 Claims, 13 Drawing Figures

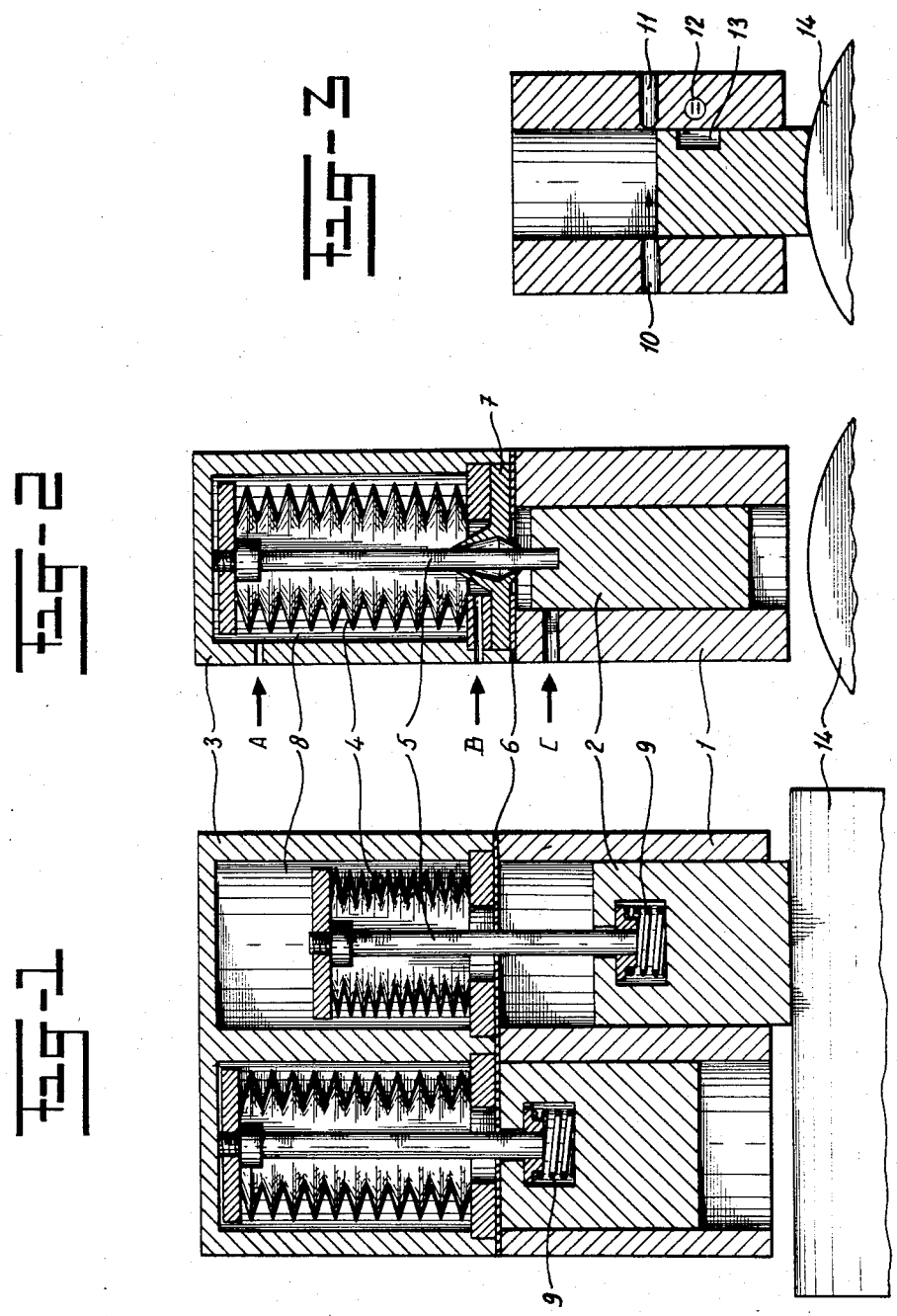

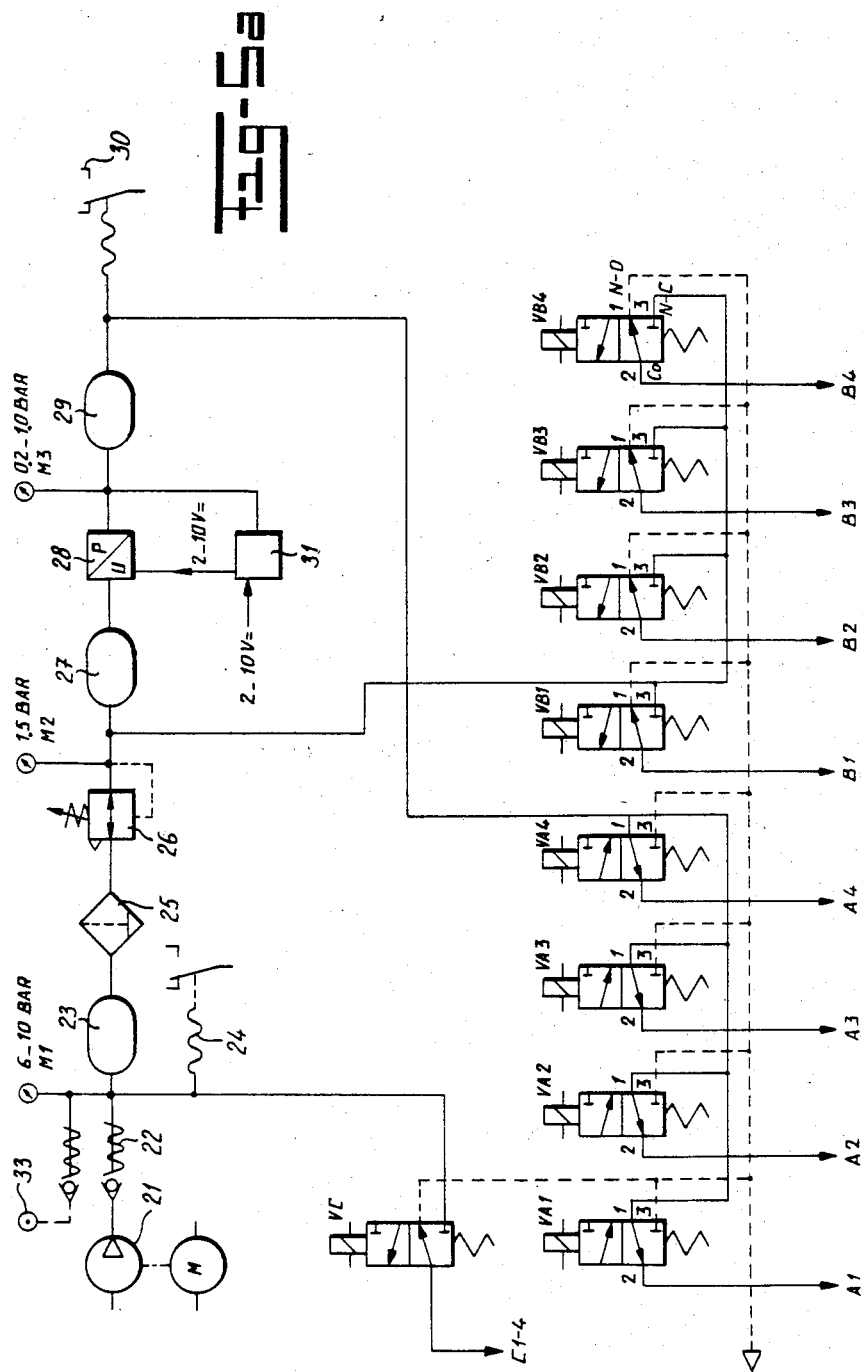

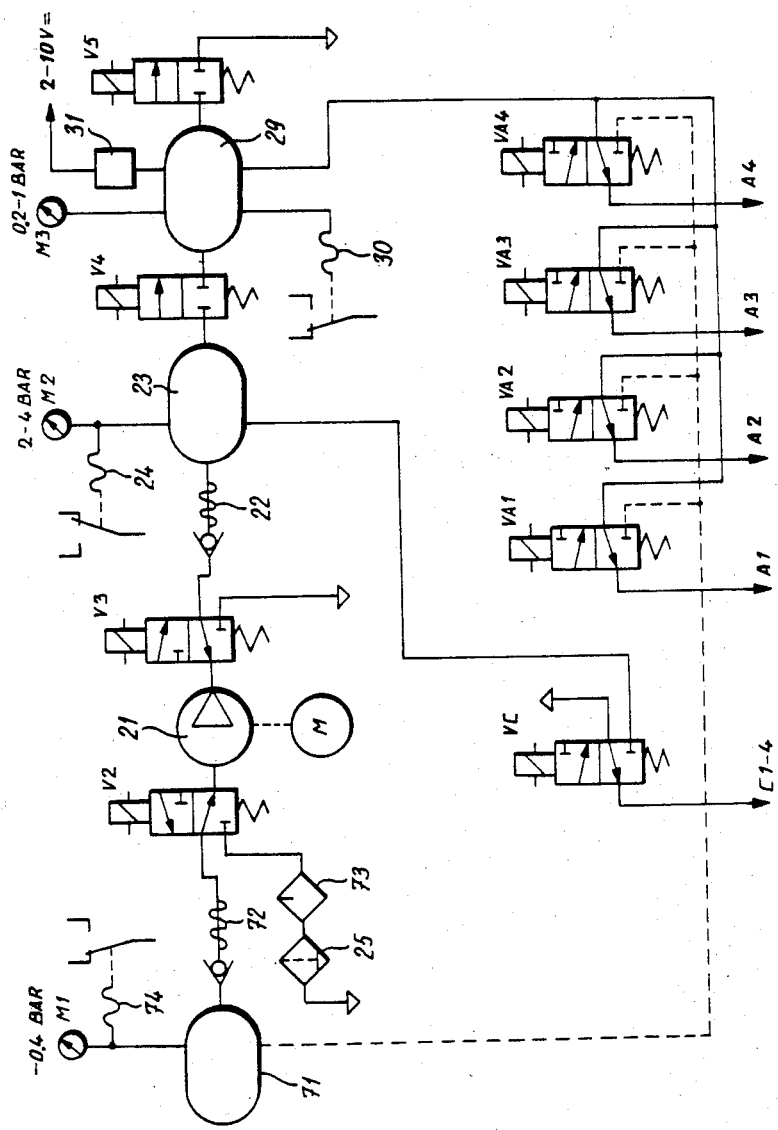

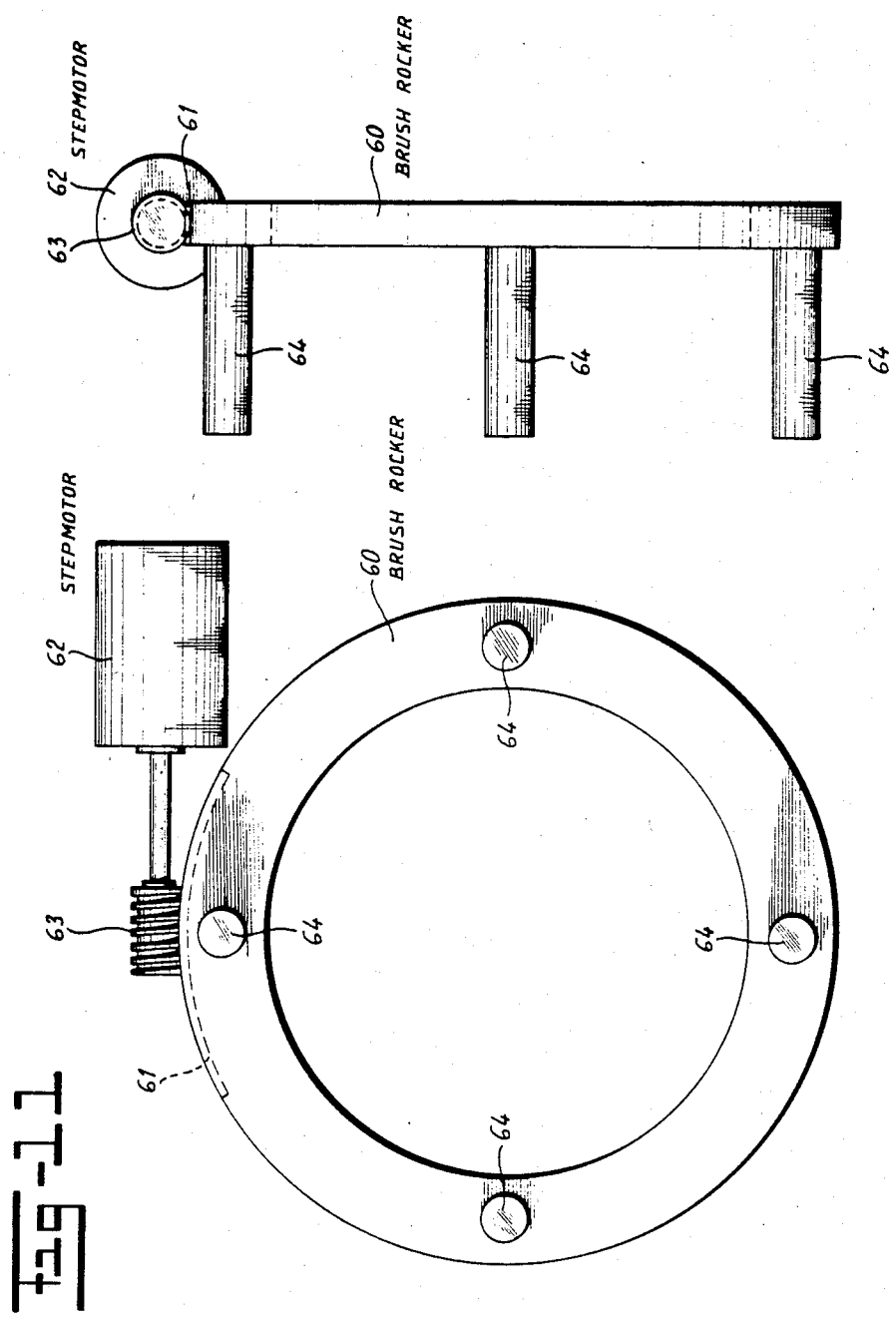

METHOD AND A DEVICE FOR CONTROLLING A BRUSH-COMMUTATOR ASSEMBLY OF AN ELECTRIC MACHINE

The invention relates to a method and a device for controlling a brush-commutator assembly of an electric machine.

Contrary to other types of rotating electric machines direct current generators and motors and alternating current commutator motors are machines equipped with a commutator or collector. The current is thereby collected (generator) or supplied (motor) with the aid of carbon brushes mounted in brush holders. Though the electrical and mechanical properties of these commutator machines have been improved much by the use of modern materials and calculation methods, the brush-commutator assembly has not been essentially changed. The carbon brushes are still pressed onto the commutator by means of a mechanical spring despite the fact that in the past patented brush devices, without springs, have been proposed, which devices due to their complexity have not been used in practice. Recently it is true one has attempted to replace the brush-commutator assembly by a commutation device based on switching thyristors. Due to many complications, high costs and insufficient reliability such replacement was no real success as yet.

As a result of the modern power electronics and the need of energy saving speed controlled drives, commutator machines, in particular direct current motors, have become very attractive. The efficiency of these machines is the same or better than that of other motors and the efficiency of the associated direct current thyristor controls is significantly better than that of frequency controls for instance. The brush-commutator assembly however remains a problem particularly in those applications involving underloaded operation for long periods of time like in controlled pump and fan applications. A reliable operation is found to be hardly possible due to the abnormal brush and commutator wear.

For electric machines used in these applications the torque and consequently the machine current decreases for that matter with the square root of the speed this being conducive to a low current density in the brushes and a cold commutator. These machines are often operated in practice at varying underload, whereby the current density per each brush is too low for a good commutation. Consequently a skin will not be formed or is broken down. The calculated full load condition occurs only once in a while. In the present designs, brushes can only be lifted (by hand) for correcting the current density in the remaining pressed brushes if the machine is stopped and has no voltage applied, for example in case it is known in advance that the machine will be operated under low load for a long period of time. Additionally there is the problem that (for many spring types) the pressure of the mechanical spring decreases in proportion as a brush is worn off more. Different tolerances will also cause deviating pressures on brushes of the same length, whereby unequal wear is caused. Furthermore in the present designs it is impossible, upon increasing current density to increase the brush pressure and vice versa.

In addition there is the influence of the temperature that may be detrimental especially in varying cooling air, like in supply fans or in arctic environment. A minimal commutator temperature is desired for good commutation. The commutator temperature is determined among others by the temperature of the cooling air introduced, the load of the machine and the current density of the brushes. The humidity also affects the commutation and very dry environmental air has a negative influence thereon. Furthermore extreme mechanical vibrations affect the commutation negatively.

The invention envisages to eliminate the above problems. In accordance with the invention this is achieved by providing a method for controlling the brush-commutator assembly of an electric machine under application of a processing and control unit, by sensing one or more operating parameters of the electric machine, the sensing values being processed and converting into one or more control signals controlling the operation of the brush-commutator assembly to provide an optimal commutation process of the machine current.

The invention also provides a device for controlling a brush-commutator assembly of an electric machine, said control device comprising one or more sensors for sensing operating parameters of the electric machine, a processing and control unit to process the signals sensed by the sensors and to supply control signals to one or more control means controlling the operation of the brush-commutator assembly for an optimal commutation process of the machine current. In this embodiment according to the invention the brush pressure on all brushes can be adjusted to the same value independent of the length of the brush, this brush pressure being subject to further adjustment while the machine is in operation. In this embodiment the carbon brushes can also be lifted and pressed while the machine is in operation.

As the sensors for sensing the operating parameters of the electric machines, transducers can be used for sensing the machine current, the temperature of the cooling air or of the commutator, the quality of the commutation for instance by means of a high frequency filter inserted after the current sensor, the speed of revolutions optionally including the sign of the rotational direction, the humidity of the cooling air, the presence of extreme mechanical vibrations and optionally other parameters.

By means of the control device according to the invention rotating electric commutator machines can be used under all circumstances for instance at varying load, like in direct current motors for driving fans and pumps among others with the aid of direct current thyristor control, but without the disadvantage of excessive brush and commutator wear.

According to the method of the invention the pressing exerted on the brushes is controlled by a fluid under pressure and brush tracks are lifted and pressed respectively upon decrease and increase of the machine current in order to maintain an optimal current density in the brushes. To that effect the control device according to the invention comprises a fluid control circuit provided with an electrically controllable pressure system and a plurality, at least corresponding to the number of the brush tracks, of solenoid valves capable of controlling the pressing exerted on the brushes in the brush holders and the switching on and off of the brush tracks by means of the fluid under pressure under the control of the processing and control unit. The invention provides also a fluid brush holder that is small and compact and that can be used to great advantage in the control device.

In the method and the control device according to the invention the fluid may either be a liquid or air or a gas. The fluid control circuit can accordingly be a hydraulic control circuit for oil for instance, as well as a pneumatic control circuit for air or a gas for instance. It is obvious that the same holds also for the fluid brush holder.

It is known from the German Patent Specification No. DE-C-764 358 to use an airtight bellows for pressing a brush. The control of the brush pressure is dependent of only one quantity of the machine, namely the current. The possibility of lifting the brushes in order to match the current density of the brushes to low loads is not described.

The British Patent Specification No. GB-A-818 292 relates to brushes and brush holders of dynamo-electric machines which are rotary current generators. They only use collector rings and brushes, the latter of which are lifted in dependence of the exciter voltage. There is no continuous control of pressure. Commutators are not mentioned. In the complete specification only fluid pressure operated means are indicated. The reason for lifting the brushes is not indicated while also a preferential change of brush tracks is not mentioned. Mechanically, this system is quite costly and complicated.

The specification U.S. Pat. No. 3,867,679 describes an electromechanical system, in which a solenoid armature coupled to a brush is moved, due to the solenoid current, in a magnet in order to minimize friction loss when operating in low load condition thereby saving on energy. However the electromagnets constitute an additional source of loss. The device is bulky when one takes into account the wear length of the brush. When calculating the magnet volume for the desired forces this is proved; due to the resulting height the whole device cannot be built in.

All above known systems share the disadvantage that they lead to high brush holders which cannot be built-in in modern machines. The present application in contradistinction is directed to control the commutation process in its whole and to govern the wearing process of the brushes in an integrated total system.

The invention will be further elucidated with respect to some embodiments while referring to the associated drawings, in which FIG. 1 shows a longitudinal section of an embodiment of the brush holder according to the invention including two brushes;

FIG. 2 shows a cross section of the brush holder of FIG. 1;

FIG. 3 discloses the principle for signalling the brush end;

FIGS. 5a and 5b represent a diagram of two embodiments respectively of a fluid control circuit applied in the control device according to the invention;

FIG. 6 shows an electrical diagram of an embodiment of the control device according to the invention of FIGS. 4a and 5a;

FIG. 11 shows an schematic outline of a rotatable brush rocker.

Figure 4A:
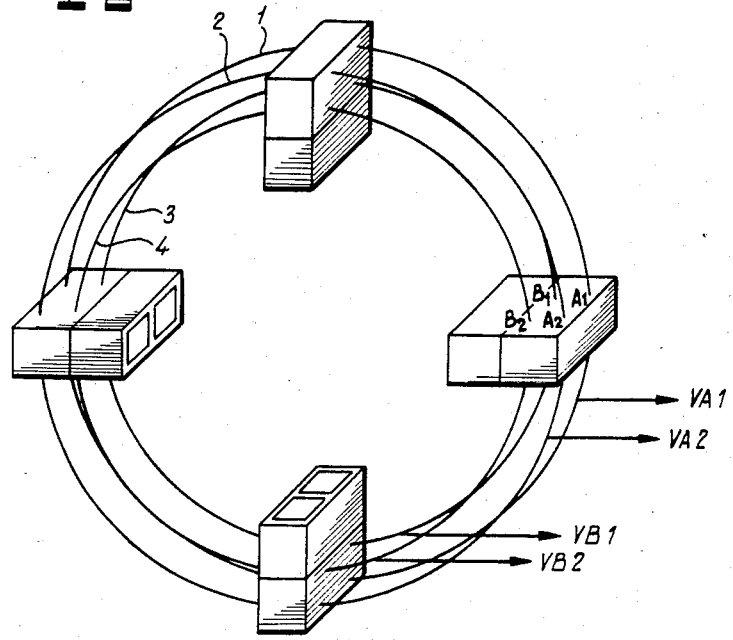
FIGS. 4a and 4b show the fluid connection of four brush holders each having two brushes which are taken in two brush tracks.

FIGS. 1, 2 and 3 represent sections of a pneumatic brush holder according to the invention in which each carbon brush 2 is pressed against a commutator 14. The brush holder may incorporate one, two or more brushes dependent on the design thereof. For each one of the brushes separately the holder comprises a brush box 1 mounted at one side of a pressing plate 6 in which brush box a carbon brush 2 can move freely and without much clearance. At the other side of the pressing plate 6 a pressure body 3 is provided including an air chamber 8 accommodating a flexible bellows 4 which at the lower flange therof is hermetically sealed to the plate 6. This flexible bellows is easily compressible in the pressure direction and the folds are sufficiently stiff in tranverse direction to prevent upsetting in case of overpressure and underpressure. A pressing pin 5 coupled to the carbon brush is fastened in an airtight manner to the upper flange of the bellows 4. This pressing pin may be connected to the carbon brush 2 through a spring loaded fastening 9 in order to properly follow slight irregularities in the running surface of the commutator and to damp possible exterior vibrations. For an easy replacement of the brush this connection may also be made to a click mechanism.

In the pressure body 3 a channel A is provided through which the air chamber 8 may be brought at overpressure. The pressure exerted on the brush is determined by the magnitude of the overpressure and the possible counteracting or cooperating elasticity of the bellows per se. For eliminating the latter as much as possible and rendering the overpressure the sole determining factor for the pressure exerted on the brush, the bellows is very easily compressible. For lifting the brush, overpressure can be brought into the interior of the bellows by way of a second channel B running through the wall and the lower flange of the bellows, whereby this bellows together with the brush is moved upwards. The channel A in this case communicates with atmospheric pressure. Under these circumstances there is provided a bush 7 surrounding the pressing pin 5, the collar of which guarantees an airtight sealing to this pin 5. The channel B may however also be omitted and instead of overpressure underpressure may now be supplied into the air chamber 8 via channel A whereby the bellows together with the carbon brush is moved upward. In this case the bush 7 is superfluous.

When the bellows is completely compressed the brush cannot be lowered further and becomes blocked whereby damage by the lytze wire of the commutator is prevented. Signalling the end (almost) of a brush may be performed by means of a combination, connected to the processing and control unit, of a light emitting element 10 and a light sensitive sensor 11 or a combination of a permanent magnet 13 inserted in the carbon brush and a reed contact 12. Preferably this signalling is transmitted some millimeters before the bellows is completely compressed whereby a prewarning is then given to the control unit.

In FIG. 2 there is shown an other channel C in the brush box. By means of a timing circuit in the processing and controlling unit, high pressure air can be supplied periodically, for instance once a week, for a short time of ten seconds for instance for blowing away possible brush dust in the brush box and on the commutator. The bush 7 mounted on the pressing plate 6 then prevents the pressure and the dust from reaching the interior of the bellows. Upon sensing the air near the commutator being too dry, especially moistened air can be supplied to the brush-commutator assembly by way of channel C under the control of the processing and controlling unit in order to acquire a proper humidity level.

If the pressure body 3 is made of transparent material a graduation in millimeters can be provided thereon so that the brush wear is immediately readable and the checking of the brushes is very much simplified.

FIG. 4a shows an example, in this case, of a pneumatically embodied fluid connection of four brush holders each including two brushes arranged into two brush tracks. There may be provided sets of brush holders mounted side by side, each brush holder of which comprises one or more brushes. In the first and the second brush track, respectively, the air chambers in the pressure bodies are connected by way of the channels A in series to a pneumatic line 1 and 2 respectively running to an allotted pressure valve VA1 and VA2 respectively. In the first and the second brush track, respectively, the interior spaces of the bellows are connected by way of the channels B in series to a pneumatic line 3 and 4, respectively running to an other value VB1 and VB2 respectively for simultaneously lifting the pertaining carbon brushes in one track.

Figure 4B:
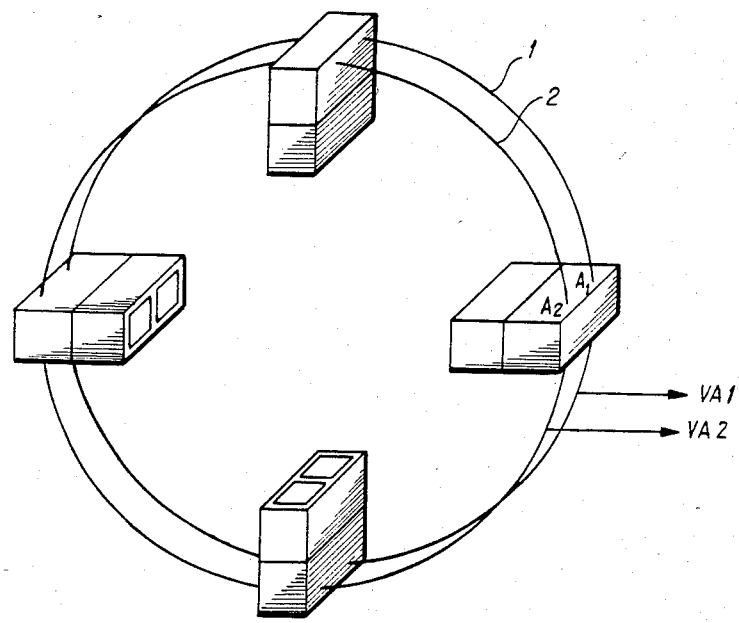

FIG. 4b shows such an example in the case that the pressing occurs via overpressure in channel A and the lifting occurs via underpressure in channel A. The air chambers in the pressure bodies in the first and second brush tracks respectively are connected via channels A in series to a pneumatic line 1 and 2 respectively, which are connected to the "common" (co) of an allotted value VA1 and VA2 respectively. The normally open (N-O) connection of the valve is connected to excess or overpressure; the normally closed (N-C) connection of the valve is connected to underpressure. In the non-energized state of the valve a complete brush track is pressed; in the energized state of the valve a complete track is lifted.

FIG. 5a represents the diagram of the fluid control circuit according to the configuration of FIG. 4a, in this case of a pneumatic type which is controlled by the processing and control unit. From the compressor 21 compressed air or gas at relatively high pressure is supplied here to a high pressure vessel or buffer 23 by way of the non-return valve 22. Downstream of the non-return valve a line is connected to a valve VC, to the outlet of which the channels C included in all tracks are connected for cleaning the brushes and the commutator by blowing. Reference numeral 24 denotes a pressure switch of the compressor 1 having an adjustable switching differential. The buffer 23 can also be connected to a junction 33 of a compressed air distribution system if present so that the compressor 21 may be omitted. Downstream of the buffer 23 there are included a filter 25 and a reducing valve 26 by means of which the air pressure, of 6 to 10 bar for instance, may be reduced to about 1 to 1.5 bar. At this point a line is connected by way of the valves VB1-4 to the channels B of the brush holders in the pertaining tracks 1, 2 and so on. Downstream of the low pressure vessel or buffer 27 there is provided an electrically controlled pressure reducer 28, by means of which the outlet pressure for the controlled pressure vessel 29 is adjusted under control of the pressure transducer-control amplifier 31. The control signal from the control unit is supplied to the input of the control amplifier 31. Connected to the outlet of the buffer 29 there is a minimum pressure switch 30 which is included in the switching circuit of the electric machine. At this point a line is connected by way of the valves VA1-4 to the channels A of the brush holders in the respective tracks 1, 2 and so on. The pressure gauges M1, M2 and M3 indicate the pressure present at the pertaining points in the pneumatic control circuit.

When the solenoid valves VA1-4 are not in the solid drawn position the air channels A are connected to the striped drawn line enabling air to be vented. The same holds in the reverse sense for the valves VB1-4 and VC and the associated channels B and C. In the drawn situation all brushes are pressed down. In case a combination of a VA plus VB valve is energized, then the associated track is lifted.

FIG. 5b shows the fluid control circuit for the configuration of FIG. 4b. In case the high pressure in the high pressure vessel 23 decreases below the pressure adjusted on the pressure switch 24 (see also FIG. 6), valve V2 is energized and the compressor 21 is started. Air from the environment is drawn in by way of the filter 25 and the lubricator 73 and the high pressure vessel 23 is brought on pressure via the non-return valve 22. After the pressure, adjusted on the pressure switch, has been attained, the compressor 21 runs on for an adjustable time due to which the pressure switch 24 does not require any switching differential.

In case the vacuum in the vacuum vessel 71 decreases below the underpressure, adjusted on the underpressure switch 74, the valve V3 is energized and the compressor 21 is started. Air from the vacuum vessel 71 is drawn by way of the non-return valve 72 and is vented by way of the valve V3 to the environment.

After the underpressure switch 74 has switched, the compressor 21 runs on for an adjustable time for the same reason as described in connection with the pressure switch 24.

At the time of starting the compressor 21 both valves V2 and V3 are shortly energized from the control unit in order to enable the compressor 21 to start freely. The control pressure in the controlled pressure vessel 29 is measured with the aid of a pressure transducer 31 and is compared in the processing and control unit with the desired control pressure. In case the control pressure is too low, valve V4 is pulsatingly energized such that air from the high pressure vessel 23 flows to the control pressure vessel 29 until the desired pressure is attained. In case the controlled pressure is too high, valve V5 is pulsatingly energized such that air is blown off until the desired pressure is attained. In order to avoid the valves V4 and V5 being reciprocatingly switched on and off, an adjustable dead band is set around the desired pressure value in the processing and control unit such that when the measured pressure falls within this band valve V4 and V5 respectively drop off.

A cleaning blow valve VC is connected to the high pressure vessel 23, said valve VC in turn being connected to the channels C of the brush holders.

The valves VA1 to VA4 respectively are connected to the A channels of the brush holders. When these valves are de-energized, such as is indicated in the figure, the controlled pressure for the brush holders is applied to the same and all brush tracks are pressed. In case one or a plurality of valves VA1–VA4 are energized, underpressure is supplied to the brush holders and the connected brush track is lifted.

In order to keep the current density under the brushes at an optimal value for a good commutation, lifting or pressing the brushes in determined tracks can be carried out as a function of the following parameters: the machine current, the speed of revolutions or the armature voltage like in vens and pumps for instance, the time adjusted by a timing clock when switching from high to low load level like in fans operating during day and night for instance, and possibly other parameters.

The control of the brush pressure by way of the channels A in each one of the brush holders and through the associated solonoid valves VA1–4 can be performed on the basis of the following parameters for instance: the current load of the brushes, exceptional mechanical vibrations and the commutation quality. Under low current load conditions it is of advantage to select a lower brush pressure and under high load conditions a higher pressure. Extreme mechanical vibrations detrimentally affect the commutation process and if they exist continuously they have to be eliminated. It is also possible that dependent on the speed of revolutions for instance exceptional vibrations occur, for short or somewhat longer duration, in a certain phase of the operation of the electric machine. Under these conditions it is desired to increase the brush pressure during the occurrence of such extreme vibrations. The vibrations may be measured by means of a vibration level sensor. The adjustment of the brush pressure may also be performed on the basis of the measured commutation quality. To that effect the extent of sparking in commutation is measured by means of a special filter determining the high frequency energy generated during commutation. The output signal of this high frequency filter is a measure for the commutation quality. The brush pressure is then readjusted to a minimum signal from the filter.

The periodical cleaning of the brushes and associated commutator by blowing via the channels C in the brush holders and the solonoid valve VC can be under the control of a timing program in the processing and control unit. Likewise the channels C in the brush holders can be supplied with humid air upon detection of air being too dry near the commutator as detected by a humidity sensor. Dry conditions for that matter have a very bad effect on the commutation and the formation of skin. This may be avoided by using a mini-air humidifier during dry intervals in combination with the invention. Instead of humid air one can also supply an other gas enhancing the commutation.

Figure 6:
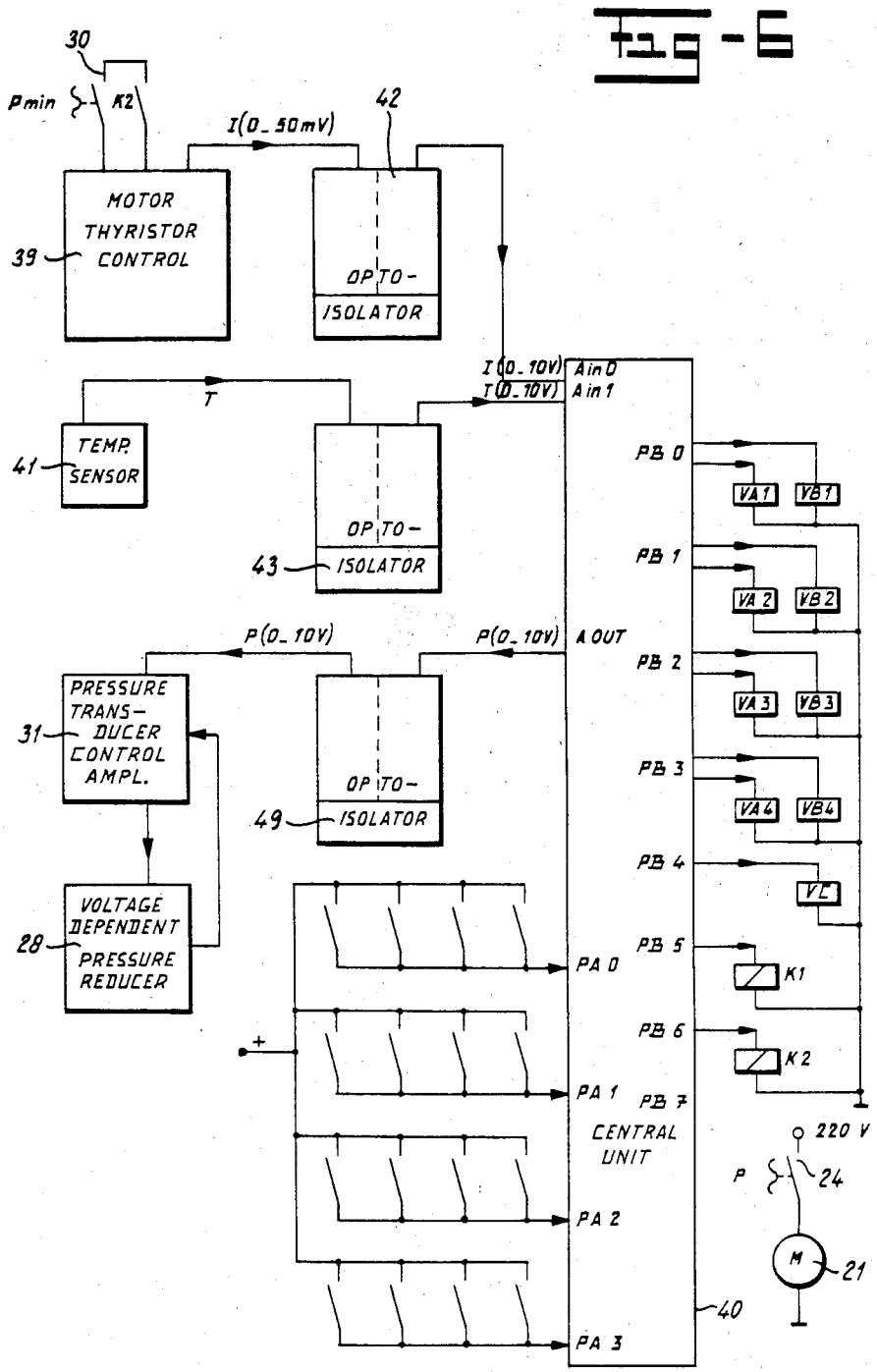
Figure 7:
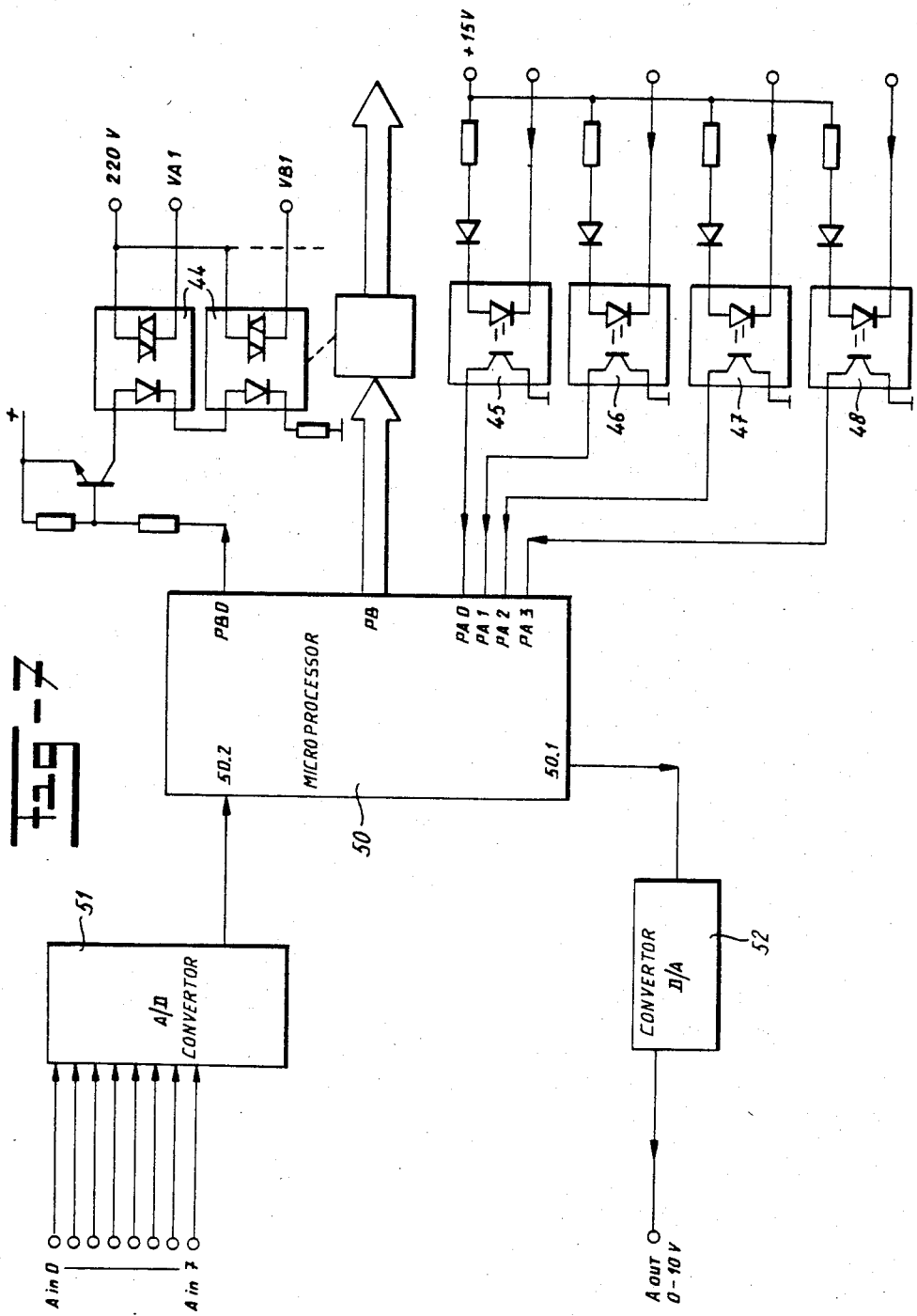
FIG. 7 shows a more detailed electrical diagram of some parts in FIG. 6.

FIG. 6 shows as an example the electrical diagram of the input and output circuits associated with the processing and control unit according to the invention and FIG. 7 shows a block diagram of the central unit 40 in FIG. 6. Both said figures also relate to the fluid control circuit of FIG. 5a. According to the processing and control functions this unit 40 can be a relay arrangement, a digital circuit, a diode matrix or a microprocessor. By way of example FIG. 7 shows a microprocessor application.

In accordance with FIGS. 6 and 7 the analog inputs of an eight channel A/D convertor 51 are supplied with analog operation parameters. For example, the machine current I and the inlet temperature T of the cooling air are supplied, by way of linear opto-isolators 42 and 43 to the first two inputs A in O and A in 1. Furthermore the multiplexer is connected to the input 50.2 of the microprocessor 50. Likewise the microprocessor 50 is supplied at the high/low inputs of PA0–3 with the end signals from the brush tracks 1–4 by way of optocouplers 45–48. Other sensors such as for sensing the temperature or humidity of the cooling air or of the commutator, mechanical vibrations, the speed of revolutions of the electric machine, the commutation quality, and so on are connected to the other six inputs of the A/D convertor 51.

Several outputs can be derived from the microprocessor 50. An eight-bits signal is supplied from the output 50.1 to a D/A convertor 52. From the output Aout thereof an analog signal is supplied to the pressure transducer-control amplifier 31 by way of a linearized opto-isolator 49. The pressure transducer-control amplifier 31 at its pressure inlet is supplied with the feed back pressure from the outlet of the pressure reducer 28. The electric output signal from the control amplifier 31 controls the voltage dependent pressure reducer 28.

For one output PB0 of the PB-output gate FIG. 7 shows an example of the output circuit for controlling the solenoid valves VA1 and VB1 by way of a double optocoupler means 44. The other outputs circuits of the outputs PB1–6 are represented by the output circuit drawn below the PB-gate in FIG. 7 and in FIG. 6, these other outputs each being connected to the other solonoid valves VA2–4, VB2–4 and VC and the relays K1 and K2 by way of optocouplers. The solonoid valves VA1, VB1 control the track 1 and so on and the valve VC serves to clean by blowing. The relays K1 and K2 serve for generating the alarm signal or service call and for switching on and off the electric machine, respectively.

The current measuring signal I generated by a measuring shunt for instance included in the thyristor control 39 of the motor is converted in the A/D convertor 51 into a hexadecimal value between 00 and FF (eight-bits conversion). Likewise the temperature measuring signal supplied by the temperature sensor 41 is converted in the A/D converter 51 into a hexadecimal value between 00 and FF. At a temperature of $+40°$ C. of the cooling air and full load operation the machine is considered to run at good current density of the brushes and to yield a good commutation with a warm collector. For attaining the same commutator temperature required for optimum skin formation though at a lower temperature of the cooling air, the nominal current density in the brushes has to be increased by lifting one of the brush tracks. In order to realize a proper lifting and pressing of the brushes, the measured machine current I is multiplied by a number A between 0.5 and 1.0 whereby a compensated current IT ($=A.I$) is obtained.

Figure 8:
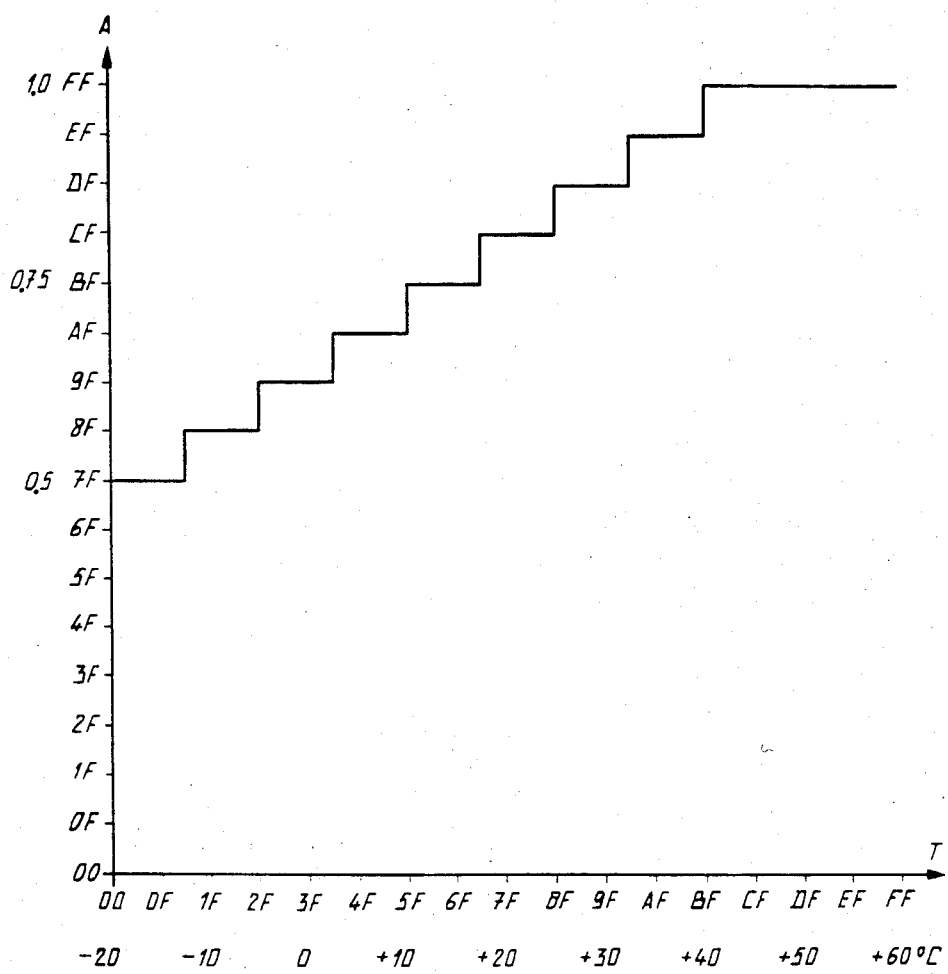
FIG. 8 shows a graphical representation as an example of the current compensation factor as a function of temperature.

The factor A is dependent on the temperature T like for instance indicated in FIG. 8. Along both the axes the pertaining hexadecimal values are plotted. This relation of the compensated current IT is stored in the microprocessor.

In order to keep the current density in the brushes at an optimal value for optimal commutation under decreasing load conditions and consequently decreasing machine current, brush tracks have to be lifted so that the total machine current is distributed over a smaller number of remaining brushes. As the effective current density under the brushes is also dependent on the temperature of the cooling air the compensated current IT can serve as switching criterion for lifting.

Figure 9:
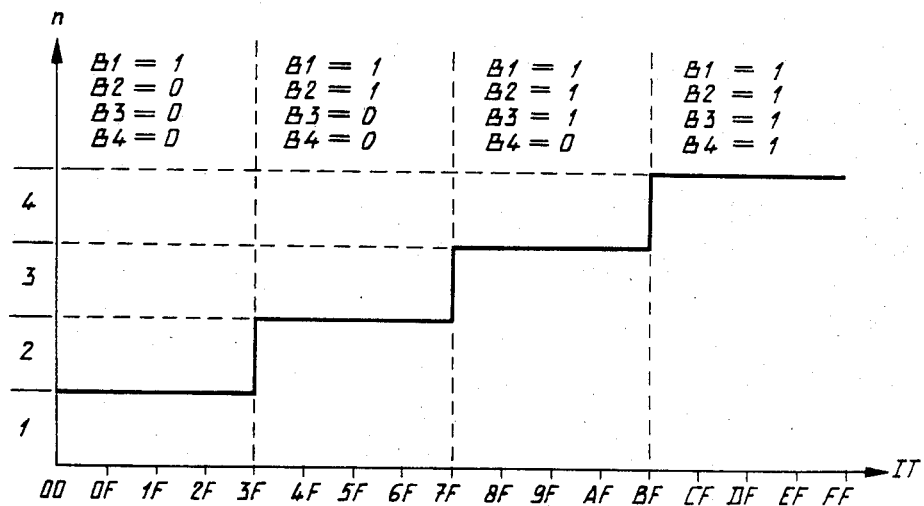
FIG. 9 shows a graphical representation as an example of pressing or lifting the brushes as a function of the compensated current.

By way of example FIG. 9 shows the criteria for switching on and off. Along the abscissa the hexadecimal values of the compensated current IT are plotted and along the ordinate the number of n pressed brush tracks. The variables B1-B4 indicated in the four columns are one-bit variables. The right hand column indicates that the four variables have a value of one corresponding to the case that all four brush tracks are pressed or n=4. The second column from the right hand side indicates that B4=0 and B1=1, B2=1 and B3=1, which corresponds to the case that only one of the four brush tracks is lifted and n=3 and so on. In order to avoid reciprocal switching one can apply, that passing a certain treshold value in both directions will only be of influence after a certain time $t_1$. For applications in which the current increases rapidly, for instance in milling or pressing machines, $t_1$ can be divided into two times: a short time when IT increases and a longer time when IT decreases.

In order to cause equal wear of the brush tracks the order in which the tracks are lifted and pressed should be changed in a cyclic and time dependent manner. The coupling between the variables B1-B4 and the outputs B01-B04 can cyclicly be shifted in the control unit after a predetermined interval $t_2$. When switching on into operation at random a track; is designated to be the most preferred one. Upon end signalling of one of the brushes in a track the pertaining track is designated to be the least preferred one.

Figure 10:
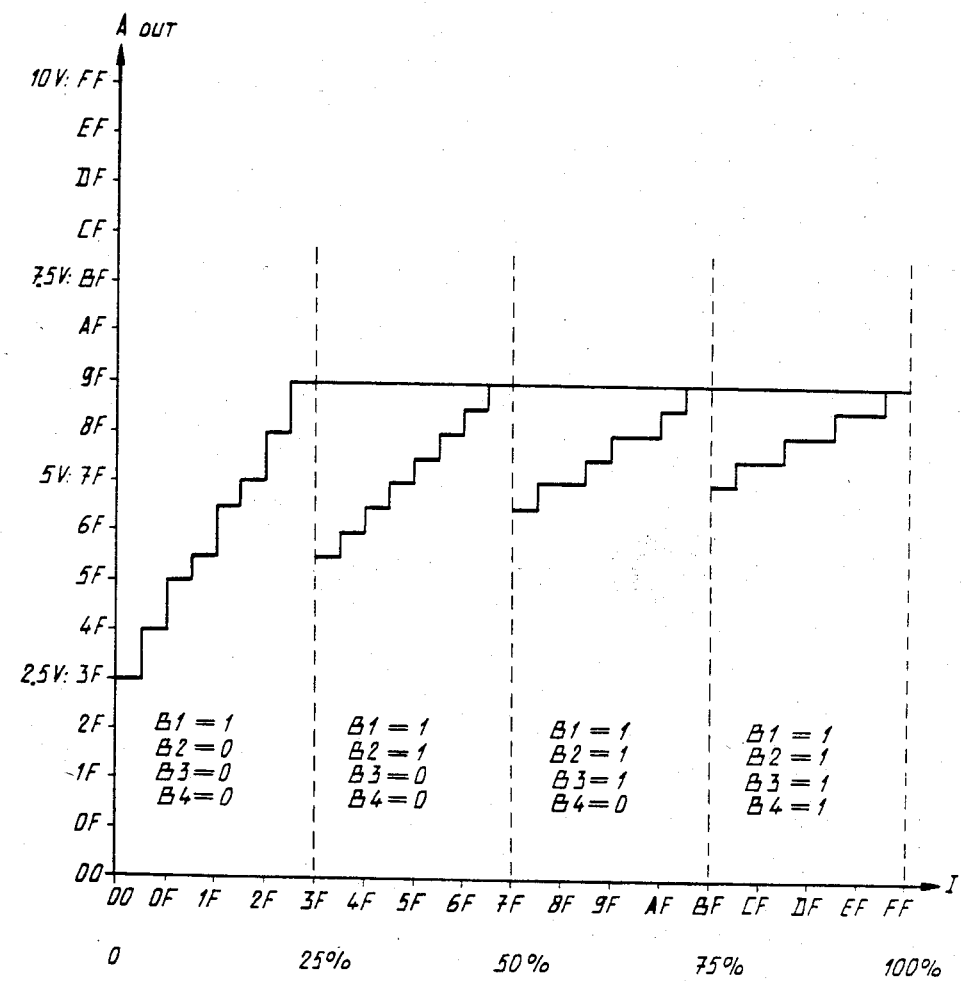
FIG. 10 shows a graphical representation as an example of the brush pressure as a function of the current.

The adjustment or control of the brush pressure in dependence on the non-compensated machine current I is shown by way of example in FIG. 10. The degree of the brush pressing is dependent on the measured current as well as on the number of pressed brush tracks. This current I and the associated hexadecimal value are plotted along the abscissa and the analog signal Aout from the D/A convertor 52 and the associated hexadecimal brush pressing value are plotted along the ordinate. The analog signal controls the control amplifier 31 which in turn adjusts the pressure reduces 28 to an output brush pressure between 0.25 and 0.65 bar for instance. By means of a voltage divider this level can be shifted for a proper adaptation to the given brush surface.

FIG. 10 shows from right hand to left hand side in which manner the associated brush pressure is adjusted for decreasing current in successively pressed numbers of four, three, two brush tracks and one brush track, respectively.

In present-day practice one starts from a brush current density of 10 amperes/cm$^2$ at a nominal brush pressure of 200 grams/cm$^2$. Dependent on the brush diameter determined by the electrical design the brush pressure can be adapted by the electrical processing and control unit. For a brush having a dimension of 20×12.5 mm and applied in a certain electric machine, a brush pressure of 200 grams/cm$^2$ corresponds to an overpressure of 500 grams. For other brush diameters the microprocessor can have certain adjustments.

Dependent on magnitude and direction of the machine current or dependent on the commutation quality the brush rocker in which the brush tracks are mounted can be adjusted till the brushes reach the true neutral zone and free commutation is rendered possible. Auxiliary poles in the machine are then no longer required.

FIG. 11 shows a diagrammatic plan view and side view of an adjustable brush rocker 60. The rocker is fastened to the bearing shield in a rotating but stable manner and is partially provided with a driving means 61 such as a gear rack. The brush rocker 60 can be adjusted by rotation by means of a servo motor or a step motor 62, on the shaft of which a pinion 63 is mounted. The servo motor or step motor 62 is provided with a position back signalling, such as a 20-turn potentiometer or shaft encoder. The control signal for adjusting the brush rocker is obtained from one of the outputs of the processing and control unit, whereas the position back signalling is returned to one of the inputs. The not shown brush holders are mounted on the pins 64 of the brush rocker.

The brush rocker can also be adjusted on the basis of the detected commutation quality. Hereby the brush rocker is rotated until a minimal signal is received from the above mentioned high frequency filter.

The control device is very reliable due to in particular the applied pneumatic control circuit including the buffers. Likewise the electrical circuits are very reliable due to the employed isolated inputs and outputs. If however a defect occurs in the control device all brushes, despite the dropping off of the energization of the valves, will remain pressed as a result of the pneumatic pressure remaining in existance. In view of the fact that there are theoretically no air losses in the brush holders, the brush pressing in the pneumatic control circuit will be maintained "infinitely" by the buffers. In addition a minimum pressure switch 30 is provided which will switch off the electric machine if the pneumatic pressure would become insufficient.

Due to the capability of end signalling accommodated in the brush holder in case of a practically worn-out brush a warning signal can be given by way of the processing and control unit. A regular inspection can also be performed by means of the graduation provided on the transparent pressure body whereby the brush wear can be observed.

In case the regulation of the control pressure is done in accordance with FIG. 5b, then in case of the control pressure being too low, air is pulsatingly applied from the high pressure vessel through the valve V4. By means of the processing and control unit it is counted how many pulses are required. The most unfavourable situation is indicated in FIG. 10 when the current increases from zero load to 25% load and the pressure has to increase from a heximal value 3F to 9F. When a small admissable leakage is taken into account it is known how many pulses are required for normal conditions. In case significantly more pulses are counted now, this means that there should be a leakage somewhere. As it is also recorded which brush track is switched in the last, it is thereby also known in which brush track the leakage occurs. This can be reported as a warning via the processing and control unit.

In the processing and control unit a higher priority is given to pressurizing the high pressure vessel 23 in comparison with the vacuum drawing of the vacuum vessel 71.

Furthermore the time can be recorded during which the compressor uninterruptedly runs. In case this time is substantially longer than normal, this can be used as a general criterion for leakage reporting after which the device even possibly switches off.

The automatic cleaning action by blowing renders an intermediate inspection superfluous. Due to the automatic lifting and pressing of the brushes at lower or higher machine current and the cyclic preferential change of the brush tracks, the commutation is improved such resulting in longer live times of the brushes. This means also that no more brushes are engaged in the commutation then really necessary whereby additional mechanical wear is avoided.

I claim:

1. A method for controlling a brush-commutator assembly of a commutator machine under application of an electrical processing and control unit, by sensing one or more operating parameters of the commutator machine; the sensing values being processed and converted into one or more control signals controlling the operation of the brush-commutator assembly to provide an optimal commutation process of the machine current, said brush-commutator assembly including two more brush tracks for the brushes, whereby the machine current is sensed and the pressure exerted on the brushes is continuously regulated by a fluid under pressure, the brush tracks being engaged and disengaged to redistribute the machine current—upon an increase and decrease of the machine current respectively—for maintaining an optimal current density in the brushes and to change over the brush tracks in a cyclical and preferential manner to provide equal brush wear.

2. The method according to claim 1 characterized in that the humidity of the cooling air is sensed near the commutator in response to which humid air or gas is injected to the commutator.

3. The method according to claim 1 characterized in that the quality of commutation is sensed from the commutation noise on the machine current, the high frequency energy of said noise being measured with the use of a high-frequency filter.

4. The method according to claim 1 characterized in that the speed of revolutions of the commutator machine is sensed.

5. A device for controlling a brush-commutator assembly of a commutator machine, comprising one or more sensors, including a machine current sensor, for sensing operating parameters of the commutator machine, an electrical processing and control unit to process the signals sensed by the sensors and to supply control signals to one or more control means controlling the operation of the brush-commutator assembly for an optimal commutation process of the machine current, said brush-commutator assembly comprising sets of brush holders, divided into two or more brush tracks, whereby said device includes a fluid control circuit provided with an electrically controllable pressure system and a plurality, at least corresponding to the number of the brush tracks, of solonoid valves capable of continuously regulating the pressure exerted on the brushes in the brush holders and the engagement and disengagement of the brush tracks, to redistribute the machine current and to change over the brush tracks, by means of the fluid under pressure under the control of the electrical processing and control unit.

6. The control device according to claim 5 in which each one of the brush holders includes a brush box slidingly mounting the brush and in which a pressure body, having an air chamber and a flexible bellows therein, is fastened on the brush box through a pressing plate hermetically sealing the lower flange of the flexible bellows in the pressure body, whereas a pressing pin connected to the brush and running through an aperture in the pressing plate is fastened to the upper flange of the bellows, and in which in the wall of the pressure body there is provided a channel for supplying over or underpressure air in the space between bellows and wall.

7. The control device according to claim 6 characterized in that the pressure body further comprises a sealing bush between pressure plate and lower flange of the flexible bellows and a second channel in the wall and through the lower flange of the bellows while debouching into the bellows for supplying overpressure air within the bellows.

8. The control device according to claim 7 characterized in that the brush box includes a channel for supplying overpressure air or humid air.

9. The control device according to claim 5 characterized by a sensor for sensing the speed of revolutions.

10. The control device according to claim 9 characterized by a sensor for sensing the humidity of the cooling air or the humidity of the air near the commutator.

11. The control device according to claim 5 characterized by a sensor followed by a high frequency filter for sensing the commutation quality.

12. The control device according to claim 5 characterized in that the processing and control unit is embodied such that the pressing exerted on the brushes is determined as a function of the sensed machine current and the number of brush tracks being engaged.

13. The control device according to claim 5 characterized in that the processing and control unit is constructed and arranged such that the order of engagement and disengagement of the brush tracks is changed cyclically and time dependently.

14. The control device according to claim 13 characterized in that each one of the brush holders has an end signalling means in the brush box for signalling the close proximity of the end position of a worn brush to the processing and control unit, the latter transmitting a warning signal and/or marking the pertaining brush track as the least preferred in the track changing.

15. The control device according to claim 14 characterized in that the end signalling means is a combination of a light emitting element and a light sensitive element in two opposite walls of the brush box.

16. The control device according to claim 14, characterized in that the end signalling means is a combination of a magnet within the brush and a reed element in the wall of the brush box.

17. The control device according to claim 9 characterized in that the processing and control unit includes a microprocessor.

* * * * *